(12) United States Patent
Chandra et al.

(10) Patent No.: US 8,572,553 B2
(45) Date of Patent: Oct. 29, 2013

(54) SYSTEMS AND METHODS FOR PROVIDING FEEDBACK FOR SOFTWARE COMPONENTS

(75) Inventors: Anca Andreea Chandra, San Jose, CA (US); Benjamin Gordon Shaw, San Francisco, CA (US); Hovey Raymond Strong, Jr., San Jose, CA (US); Jakita Nicole Owensby Thomas, Decatur, GA (US)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 13/158,352

(22) Filed: Jun. 10, 2011

(65) Prior Publication Data
US 2012/0317545 A1    Dec. 13, 2012

(51) Int. Cl.
*G06F 9/44*    (2006.01)
(52) U.S. Cl.
USPC .......................... 717/105; 717/100; 717/127
(58) Field of Classification Search
None
See application file for complete search history.

(56) References Cited

U.S. PATENT DOCUMENTS

| | | | |
|---|---|---|---|
| 7,844,482 B1* | 11/2010 | Larson | 705/7.31 |
| 8,001,527 B1* | 8/2011 | Qureshi et al. | 717/100 |
| 8,132,157 B2* | 3/2012 | Dhuvur et al. | 717/127 |
| 8,196,114 B2* | 6/2012 | Diao et al. | 717/127 |
| 8,271,951 B2* | 9/2012 | Brugler et al. | 717/105 |
| 8,307,357 B2* | 11/2012 | Bergman et al. | 717/174 |
| 2002/0147966 A1* | 10/2002 | Frazier | 717/127 |
| 2004/0153992 A1* | 8/2004 | Molina-Moreno et al. | 717/105 |
| 2006/0212444 A1 | 9/2006 | Handman et al. | |
| 2006/0271591 A1* | 11/2006 | Murphy et al. | 707/103 R |
| 2007/0220479 A1* | 9/2007 | Hughes | 717/100 |
| 2007/0226201 A1 | 9/2007 | Lerum et al. | |
| 2008/0126887 A1* | 5/2008 | Brodeur et al. | 714/57 |
| 2008/0178083 A1* | 7/2008 | Bergman et al. | 715/704 |
| 2009/0254877 A1* | 10/2009 | Kuriakose et al. | 717/105 |
| 2009/0287655 A1 | 11/2009 | Bennett | |
| 2009/0327866 A1* | 12/2009 | Li et al. | 715/234 |
| 2010/0281426 A1 | 11/2010 | Schmidt | |
| 2011/0314438 A1* | 12/2011 | Surazski et al. | 717/100 |
| 2012/0260230 A1* | 10/2012 | Choudhary et al. | 717/105 |
| 2012/0317549 A1* | 12/2012 | Cunningham et al. | 717/128 |
| 2012/0331439 A1* | 12/2012 | Zimmermann et al. | 717/101 |

FOREIGN PATENT DOCUMENTS

| | | |
|---|---|---|
| JP | 2009211723 | 9/2009 |
| WO | 9517711 | 6/1995 |

OTHER PUBLICATIONS

Liu et al., "A visual language and environment for specifying user interface event handling in design tools", 2007 Australian Computer Society, Inc., AUIC2007, pp. 87-94; <http://dl.acm.org/citation.cfm?id=1273728>.*

Yuan et al., "Iterative execution-feedback model-directed GUI testing", 2009 Elsevier B. V., pp. 559-575; <http://www.cs.umd.edu/~atif/papers/YuanMemonIST2010.pdf>.*

(Continued)

*Primary Examiner* — Thuy Dao
*Assistant Examiner* — Ben C Wang
(74) *Attorney, Agent, or Firm* — Ference & Associates LLC

(57) ABSTRACT

Systems and methods for transforming applications to provide uniform mechanisms for commenting on application objects, and mechanisms for collecting and processing feedback are described herein. An aspect provides for analyzing application code for at least one user action event handler associated with at least one object; and for modifying each at least one user action event handler located within the application code to contain at least one action configured to handle feedback for the associated at least one object; wherein invoking the at least one user action event handler triggers the at least one action configured to handle feedback. Other embodiments and aspects are also described herein.

13 Claims, 3 Drawing Sheets

(56) References Cited

OTHER PUBLICATIONS

Yuan et al., "Using GUI Run-Time State as Feedback to Generate Test Cases", 2007 IEEE, ICSE'07, pp. 1-10; <http://ieeexplore.ieee.org/stamp/stamp.jsp?tp=&arnumber=4222601>.*

Chuang et al., "User Behavior Augmented Software Testing for User-Centered GUI", 2011 ACM, RACS'11, Nov. 2-5, 2011, Miami, FL, USA, pp. 200-208; <http://dl.acm.org/citation.cfm?doid=2103380.2103421>.*

Betzwieser, Sarah E., et al., "Department of Athletics: Policies and Procedures Manual", Proceedings of the 2004 Systems and Information Engineering Design Symposium, Apr. 16, 2004, pp. 157-162, Department of Systems and Information Engineering, University of Virginia, Charlottesville, Virginia.

* cited by examiner under development, web sites, device interfaces, mobile applications, including those for smart phones and tablets, and the like. As a non-limiting example, embodiments may provide feedback mechanisms for developers, such as through targeted commenting on specific components.

SYSTEMS AND METHODS FOR PROVIDING FEEDBACK FOR SOFTWARE COMPONENTS

BACKGROUND

Feedback plays an important role in software development, maintenance, and improvement. This is especially true for graphical user interfaces (GUI), which provide the necessary connections between users and software functions. Essentially, this feedback may come during any time in the lifecycle of an application, web site, driver, or device interface, such as during a learning experience, debugging, user acceptance testing, or after the product has been launched.

Developers may benefit from feedback in many ways, including receiving input about issues or beneficial enhancements that they may not have determined on their own. In addition, application testers and users may put the application through many more situations and can provide feedback as to how the software performed during such real-world conditions. However, the value of feedback is often restricted because of the timing involved, especially considering the pace of software development and the longevity of such products in the marketplace. In addition, users typically only have a few seconds to spare for feedback and there are many inherent difficulties when interpreting the actual feedback text into a useful form for developers.

BRIEF SUMMARY

In summary, one aspect provides a method comprising: analyzing application code for at least one user action event handler associated with at least one object; and modifying each at least one user action event handler located within the application code to contain at least one action configured to handle feedback for the associated at least one object, the feedback comprising user input and an identifier for the at least one object; wherein invoking the at least one user action event handler triggers the at least one action configured to handle feedback.

Another aspect provides a system comprising: at least one processor; and a memory device operatively connected to the at least one processor; wherein, responsive to execution of program instructions accessible to the at least one processor, the at least one processor is configured to: analyze application code for at least one user action event handler associated with at least one object; and modify each at least one user action event handler located within the application code to contain at least one action configured to handle feedback for the associated at least one object, the feedback comprising user input and an identifier for the at least one object; wherein invoking the at least one user action event handler triggers the at least one action configured to handle feedback.

A further aspect provides a computer program product comprising: a computer readable storage medium having computer readable program code embodied therewith, the computer readable program code comprising: computer readable program code configured to analyze application code for at least one user action event handler associated with at least one object; computer readable program code configured to modify each at least one user action event handler located within the application code to contain at least one action configured to handle feedback for the associated at least one object, the feedback comprising user input and an identifier for the at least one object; and computer readable program code configured to trigger the at least one action configured to handle feedback responsive to invoking the at least one user action event handler.

The foregoing is a summary and thus may contain simplifications, generalizations, and omissions of detail; consequently, those skilled in the art will appreciate that the summary is illustrative only and is not intended to be in any way limiting. For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
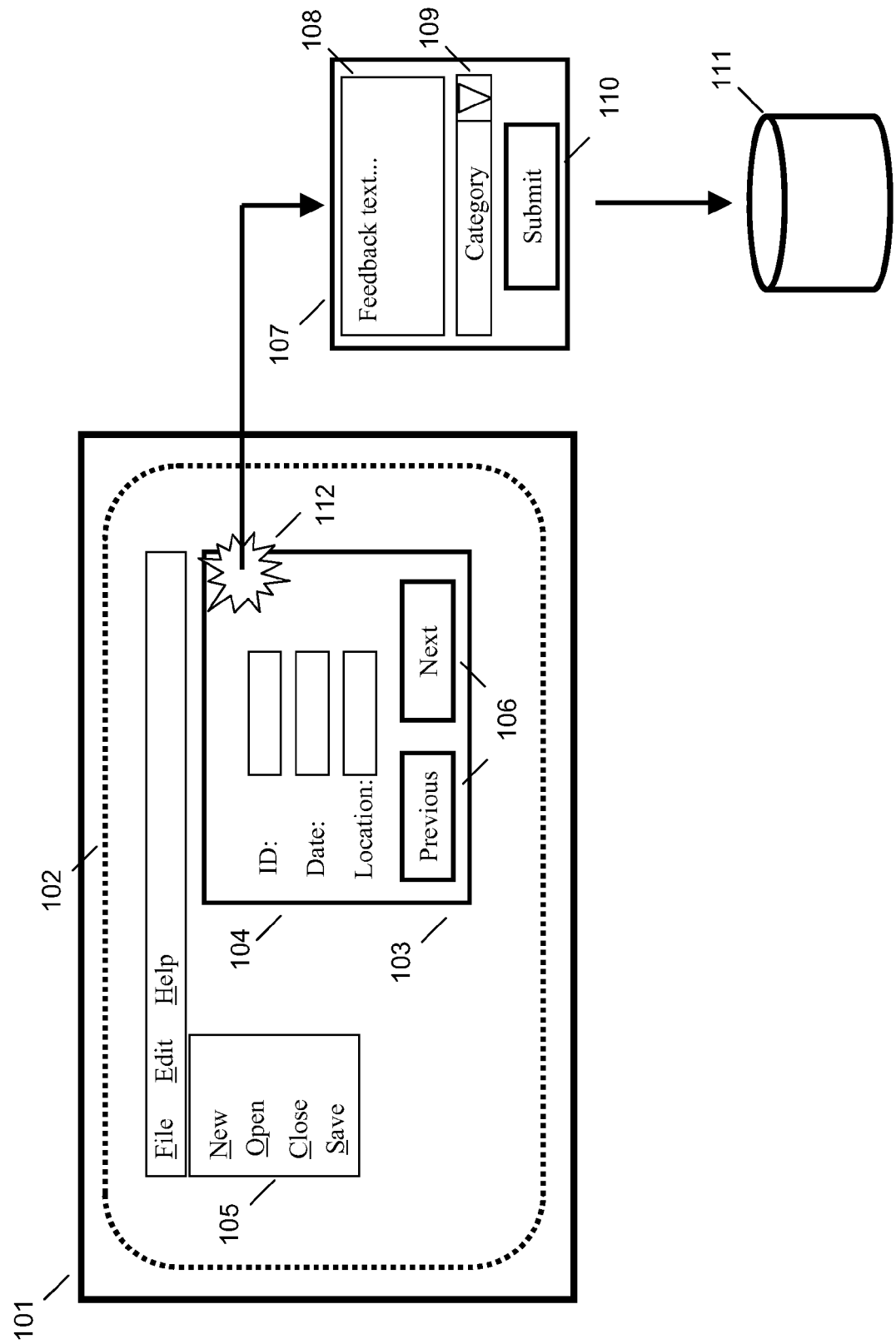
FIG. 1 provides an example application with GUI component feedback.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of certain example embodiments.

Reference throughout this specification to an "embodiment" or "embodiment(s)" means that a particular feature, structure, or characteristic described in connection with the embodiment is included in at least one embodiment. Thus, the appearances of "embodiment" or "embodiment(s)" in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid prolixity.

Feedback is important during the lifecycle of software applications, including software programs, device interfaces and applications, drivers, and web sites. However, there are many barriers that prevent feedback from reaching developers in time and in a form capable of efficiently and effectively shaping product development and improvement. For example, typical feedback mechanisms according to existing technology generally do not provide for real-time or near real-time commenting, nor do they facilitate structured, targeted feedback. As such, developers using existing methods often receive feedback that is untimely and difficult to translate into real solutions. In addition, current commenting systems are not capable of providing mechanisms to effectively comment directly on specific aspects or components of an application.

Embodiments provide uniform processes for collecting feedback related to a software product, including, but not limited to, applications, device interfaces, web sites, and mobile device applications. In particular, preferred embodiments provide feedback mechanisms for application graphical user interfaces (GUI), including feedback mechanisms for individual GUI objects. Embodiments provide for transforming an application to provide users with one or more uniform methods for providing feedback regarding one or more application components. According to embodiments, feedback may be comprised of a combination of user textual comments and structured information concerning the application context and recent user activity. As a non-limiting example, feedback may be comprised of textual comments and an object identifier specifying the object associated with the feedback event. Embodiments provide that feedback may be transmitted to a repository for storage and further processing. An illustrative and non-limiting example provides that feedback may be processed such that developers may view an aggregate of comments for an application or for each individual application component.

According to embodiments, software applications may be transformed to provide an expanded feature set that allows for one or more uniform methods of providing feedback and comments relating to components of the software application. Embodiments may receive a program as input and output a modified program, including, but not limited to, modified functions, objects, libraries, processes, and code segments modified to allow feedback and comments. Embodiments provide that an input application may be analyzed for certain user events that may be associated with providing feedback, such as function calls for one or more specified feedback trigger events (e.g., right-click, mouse hover), and the corresponding sections of code may be modified to include feedback trigger functions and related events.

Embodiments may transform any application to provide a uniform set of feedback mechanisms. As such, embodiments provide a set of feedback mechanisms that may be common across development platforms, applications, devices, programming languages, methods, and the like. Accordingly, a user will know that for any feedback-enabled application configured according to embodiments, certain feedback triggers will elicit one or more feedback mechanisms. As an illustrative and non-restrictive example, a user will be aware that he may provide feedback by right-clicking on an object within an application running on his mobile computing device (e.g., smart phone) and also by right-clicking on a web site object running in a browser on his desktop PC if both are feedback-enabled according to embodiments described herein.

Embodiments provide for the addition of a feedback-triggering event for any selectable component of an application GUI, including, but not limited to, right-clicking on a GUI component. In response to invoking the feedback-triggering event on a component, a feedback form may be made available according to embodiments, the form providing an area for a user to submit text. Embodiments also provide that responsive to evoking the triggering event, a menu of choices providing the user with one or more feedback categories may be available on the feedback form. Non-limiting examples of feedback categories include, but are not limited to, wish list, help request, complaint, bug report, and general command categories. In addition, embodiments provide that feedback categories may change dynamically according to certain conditions, including, but not limited to, user type (e.g., developer, regular user), application phase (e.g., debugging, post-release), feedback context (e.g., normal use, whether application is non-responsive or "frozen"). According to embodiments, a user may transmit the text entered on a feedback form, along with any feedback categories, to one or more feedback repositories.

Embodiments also provide that other related information may be sent along with any feedback text, including, but not limited to, component or object identifiers, program stacks, click streams, and any other information available from the application. As a non-limiting example, related information may provide data concerning which objects were active, locations in the program where the particular event or object occurred, timing, order of function calls, pathways taken by the user to invoke the event or access the object (i.e., "click stream"), and the like. As such, a developer may be able to see enhanced information regarding application feedback, for example, that a large amount of feedback is directed toward a particular object, but only when it is accessed during certain operations.

Referring to FIG. 1, therein is depicted an example application allowing feedback for GUI components according to an embodiment. A GUI 101 for the example application is comprised of a hierarchy of GUI objects, including application window 102, form 103, menu bar 104, menu 105 and button 106 objects. Responsive to a user right-clicking 112 on the form 103 object, a pop-up window 107 may appear comprising an area to enter text 108, a category selection option 109, and a submit button 110. A user may enter text in the text area 108, select a feedback category 109, and then select the submit button 110 to send feedback to a feedback repository 111.

Figure 2:
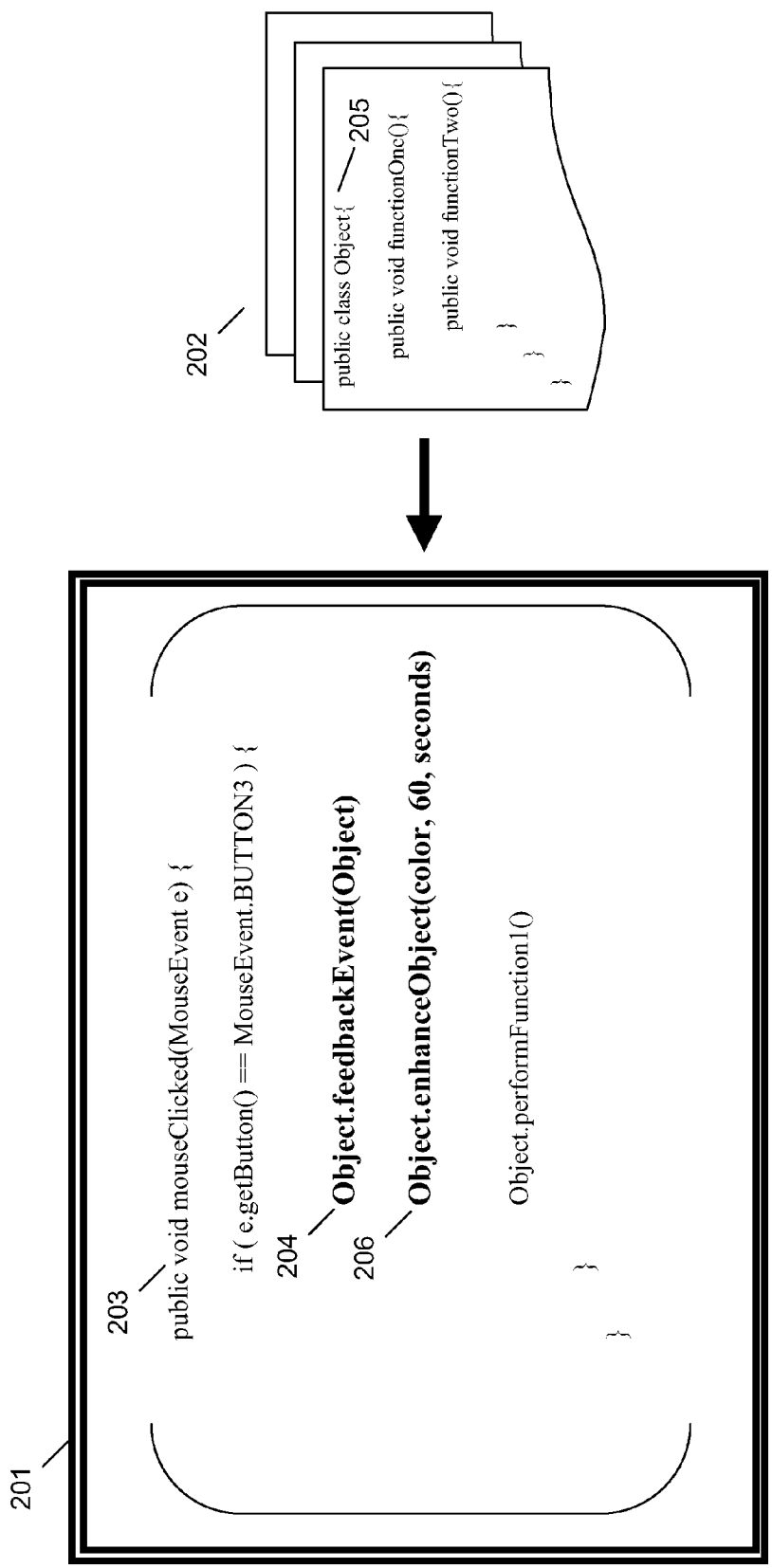
FIG. 2 provides an example of transforming an application to handle feedback mechanisms.

In FIG. 2, therein is illustrated an example of transforming an application to handle feedback mechanisms according to an embodiment. Application code 202 is provided to the transformation system 201 and analyzed for events selected for feedback. In the non-limiting example depicted in FIG. 2, a right-click event is the uniform feedback trigger event. A right-click event handler 203 is located for an application GUI object 205 in the application code 202. In the example depicted in FIG. 2, the application code 202 is Java® and the right-click event handler 203 is a MouseListener event handler configured for a right mouse click. Java® is a registered trademark of Oracle America, Inc. A feedback event 204 is added to the right-click event 203 so that a feedback mechanism will be available to users when they right-click on the GUI object. Embodiments provide for certain enhanced events that may occur along with providing a user feedback mechanism. Illustrative and non-restrictive examples include coloring or shading objects for which feedback has been entered for a specified time period. In addition, other enhancements, such as providing messages or modifications to the look and feel of the application or certain objects for a specified time period or until a certain event occurs, may be configured according to embodiments. In the example shown in FIG. 2, object enhancement code 206 is added to the right-click event 203 which changes the color of the application GUI object 205 for a predetermined period of time after feedback has been entered.

Embodiments analyze an input application for handlers of events selected to trigger one or more feedback actions and, in addition, further analyze the event handlers for existing event responses. According to embodiments, the event handlers are transformed such that the feedback method is integrated with the input application code to fit within the existing event responses. In general, an application component has a limited number of responses to user events. For example, when a user right-clicks on a GUI object there may be three possible responses: (1) nothing; (2) a defined action occurs; or (3) a menu is presented to the user. Embodiments transform an input application to handle all programmed responses to user events. Continuing with the right-click example, the following program modifications provide illustrative and non-restrictive examples of modification which may be made, according to embodiments, for each possible right-click response listed above: (1) a menu with feedback options or a pop-up window allowing feedback may be provided to the user; (2) one or more feedback methods may be presented to the user before or after the programmed action; and (3) an item may be added to the existing menu providing feedback options.

Embodiments provide systems and methods for processing feedback information. Illustrative and non-restrictive examples of processing include performing sentiment analysis, removing stop words, and classifying, such as through word order, sentiment, key words, and pre-defined categories selected by the user. Embodiments may process and group feedback and related information according to topic clustering principles. According to one non-limiting example, the GUI component identifier may be treated as one word for topic clustering, closeness may also be measured with cosine measurement in a vocabulary vector space. According to embodiments, feedback categorized as a help request may be matched to frequently asked questions for the particular topic.

Embodiments may also provide for processing feedback information to generate one or more histograms of activity, such as by type and topic to development. In addition, embodiments may identify the most typical type-topic pairs, as related by a relevant vocabulary vector space, of recent feedback text that appears when a user places a cursor over an appropriate part of the histogram. According to embodiments, developers and other feedback consumers may be able to visualize certain types of activity, such as aggregated or trend activity pertaining to use of subject applications.

According to embodiments, limitations may be placed on the number of characters or words allowed in a feedback message to force careful use and ordering of words. Such space limitations may be beneficial to developers and for processing purposes because feedback will be comprised of more focused comments without unnecessary verbiage and qualifiers.

Embodiments provide for the collection and classifying of feedback generated by the user of an application. According to certain embodiments, feedback mechanisms are provided for an application GUI and the application GUI components. One or more user action event handlers are provided for presenting a user with mechanisms for providing feedback. Although the right-click mouse event has been used as an example feedback-triggering event herein, embodiments are not so limited, as any event capable of triggering a feedback mechanism may be utilized. Non-limiting examples of user action event handlers include mouse events such as left-click, right-click, and hovering over an object (e.g., for a specified period of time), or keyboard events such as selecting the object and pressing the "Enter" or "F1" keys. Feedback may also be classified according to embodiments. Illustrative and non-restrictive examples of classification methods include classifying by type based on structured information and word order, or classifying by topic based on vocabulary independent of word order.

Figure 3:
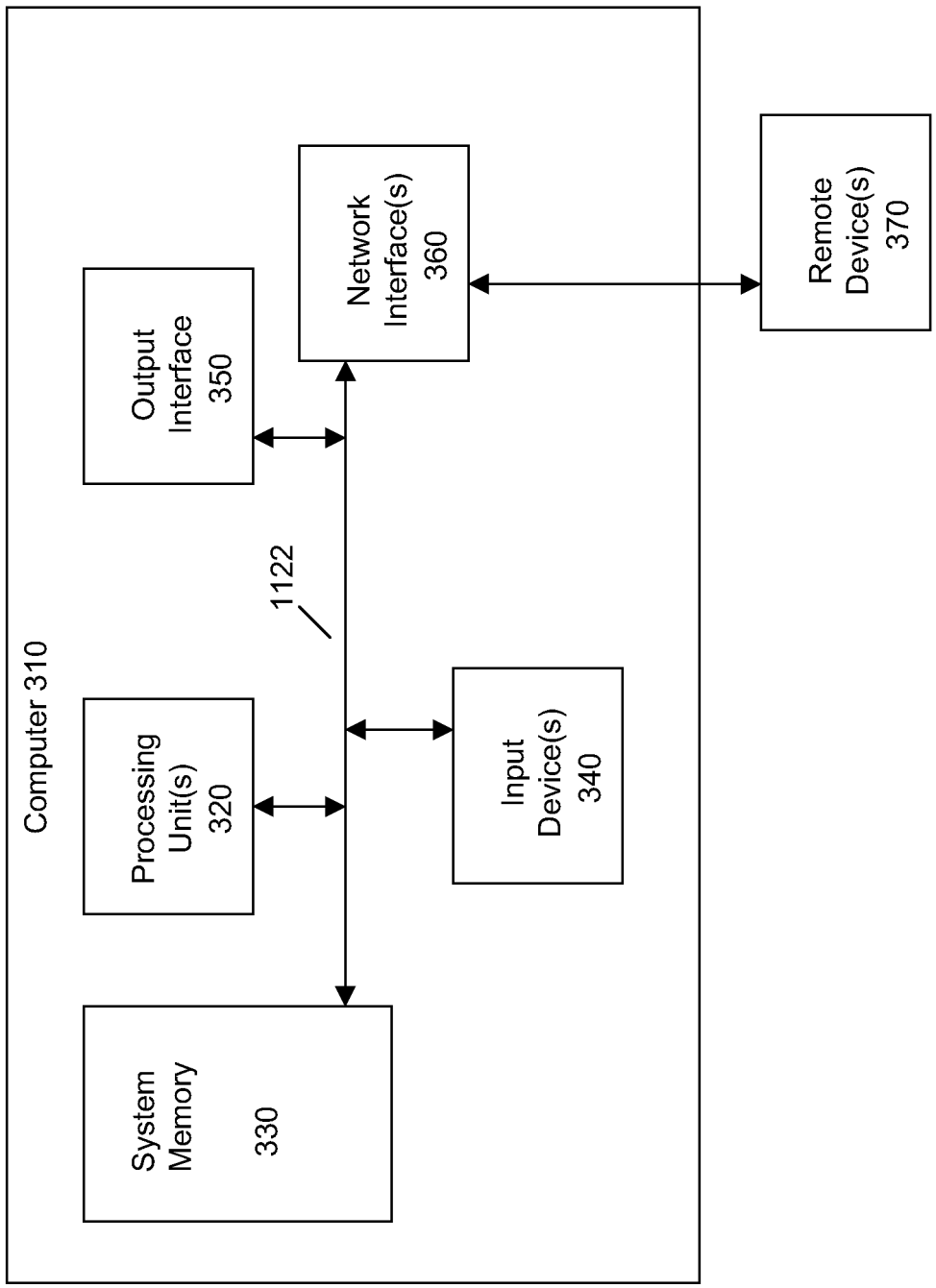
FIG. 3 illustrates an example computer system.

Referring to FIG. 3, it will be readily understood that embodiments may be implemented using any of a wide variety of devices or combinations of devices. An example device that may be used in implementing one or more embodiments includes a computing device in the form of a computer 310. In this regard, the computer 310 may execute program instructions; generate at least one information filter comprised of at least one information element; and process at least one source image using the at least one information filter, wherein processing the at least one source image comprises abstracting instances of the at least one information element detected in the at least one source image; and other functionality of the embodiments, as described herein.

Components of computer 310 may include, but are not limited to, processing units 320, a system memory 330, and a system bus 322 that couples various system components including the system memory 330 to the processing unit 320. Computer 310 may include or have access to a variety of computer readable media. The system memory 330 may include computer readable storage media in the form of volatile and/or nonvolatile memory such as read only memory (ROM) and/or random access memory (RAM). By way of example, and not limitation, system memory 330 may also include an operating system, application programs, other program modules, and program data.

A user can interface with (for example, enter commands and information) the computer 310 through input devices 340. A monitor or other type of device can also be connected to the system bus 322 via an interface, such as an output interface 350. In addition to a monitor, computers may also include other peripheral output devices. The computer 310 may operate in a networked or distributed environment using logical connections to one or more other remote computers or databases. In addition, Remote devices 370 may communicate with the computer 310 through certain network interfaces 360. The logical connections may include a network, such as a local area network (LAN) or a wide area network (WAN), but may also include other networks/buses.

It should be noted as well that certain embodiments may be implemented as a system, method or computer program product. Accordingly, aspects of the invention may take the form of an entirely hardware embodiment, an entirely software embodiment (including firmware, resident software, microcode, et cetera) or an embodiment combining software and hardware aspects that may all generally be referred to herein as a "circuit," "module" or "system." In addition, circuits, modules, and systems may be "adapted" or "configured" to perform a specific set of tasks. Such adaptation or configuration may be purely hardware, through software, or a combination of both. Furthermore, aspects of the invention may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for aspects of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatuses (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A computer-implemented method comprising:
analyzing application code for at least one user action event handler associated with at least one object, wherein the application code is for an application graphical user interface (GUI) and the at least one object comprises a GUI component; and
modifying each at least one user action event handler located within the application code to contain at least one action configured to handle feedback for the associated at least one object, the feedback comprising user input and an identifier specifying the at least one object, the user input comprising user textual comments;
wherein invoking the at least one user action event handler triggers the at least one action configured to handle feedback;
wherein feedback accepted via the at least one action configured to handle feedback is transmitted to at least one repository; and
wherein the at least one action configured to handle feedback comprises at least one pop-up window configured to accept feedback.

2. The method according to claim 1, wherein the at least one user action event handler comprises a mouse right-click.

3. The method according to claim 1, wherein the at least one action configured to handle feedback comprises at least one object enhancement action configured to enhance a GUI component responsive to feedback being provided for the GUI component.

4. The method according to claim 1, wherein the at least one action configured to handle feedback comprises a feedback menu comprising at least one feedback option.

5. The method according to claim 1, wherein the at least one action configured to handle feedback comprises at least one action for specifying at least one feedback category.

6. The method according to claim 1, wherein the feedback transmitted to the at least one repository includes application information comprising a click stream.

7. A system comprising:
at least one processor; and
a memory device operatively connected to the at least one processor;
wherein, responsive to execution of program instructions accessible to the at least one processor, the at least one processor is configured to:
analyze application code for at least one user action event handler associated with at least one object, wherein the application code is for an application graphical user interface (GUI) and the at least one object comprises a GUI component; and
modify each at least one user action event handler located within the application code to contain at least one action configured to handle feedback for the associated at least one object, the feedback comprising user input and an identifier specifying the at least one object, the user input comprising user textual comments;

wherein invoking the at least one user action event handler triggers the at least one action configured to handle feedback;

wherein feedback accepted via the at least one action configured to handle feedback is transmitted to at least one repository; and wherein the at least one action configured to handle feedback comprises at least one pop-up window configured to accept feedback.

8. The system according to claim 7, wherein the at least one user action event handler comprises a mouse right-click.

9. The system according to claim 7, wherein the at least one object comprises a GUI component.

10. The system according to claim 7, wherein the at least one action configured to handle feedback comprises a feedback menu comprising at least one feedback option.

11. The system according to claim 7, wherein the at least one action configured to handle feedback comprises at least one action for specifying at least one feedback category.

12. The system according to claim 7, wherein the feedback transmitted to the at least one repository includes application information comprising a click stream.

13. A computer program product comprising:

a non-transitory computer readable storage medium having computer readable program code embodied therewith, the computer readable program code comprising:

computer readable program code configured to analyze application code for at least one user action event handler associated with at least one object, wherein the application code is for an application graphical user interface (GUI) and the at least one object comprises a GUI component;

computer readable program code configured to modify each at least one user action event handler located within the application code to contain at least one action configured to handle feedback for the associated at least one object, the feedback comprising user input and an identifier specifying the at least one object, the user input comprising user textual comments; and computer readable program code configured to trigger the at least one action configured to handle feedback responsive to invoking the at least one user action event handler;

wherein feedback accepted via the at least one action configured to handle feedback is transmitted to at least one repository; and wherein the at least one action configured to handle feedback comprises at least one pop-up window configured to accept feedback.

\* \* \* \* \*